Aug. 19, 1952   W. H. DIEZEL   2,607,394
MACHINE FOR ADDITIONALLY SHAPING PREFORMED
CAPS OR OTHER WORKPIECES
Filed Oct. 18, 1949   9 Sheets-Sheet 5
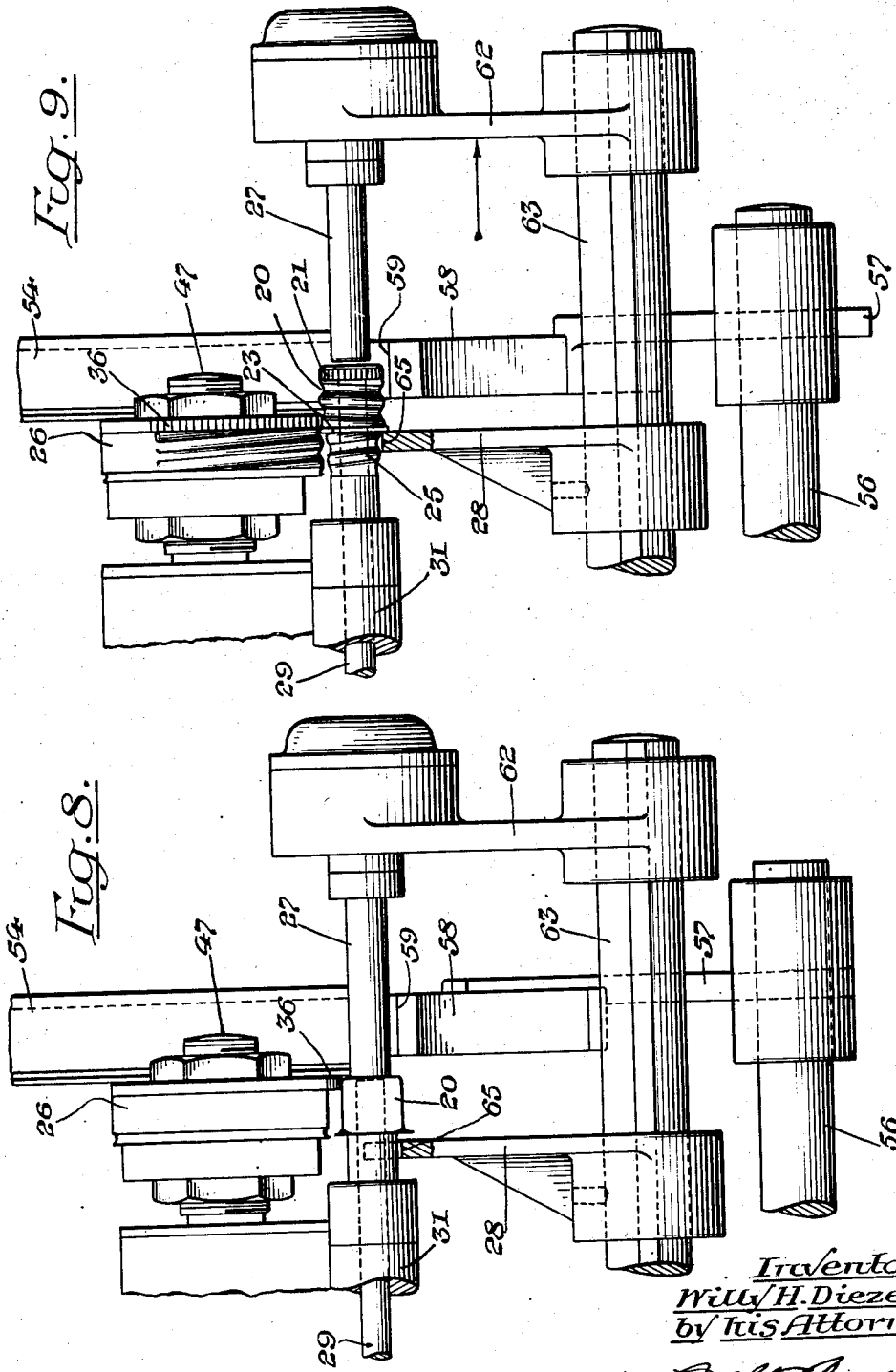
Inventor:
Willy H. Diezel
by his Attorney

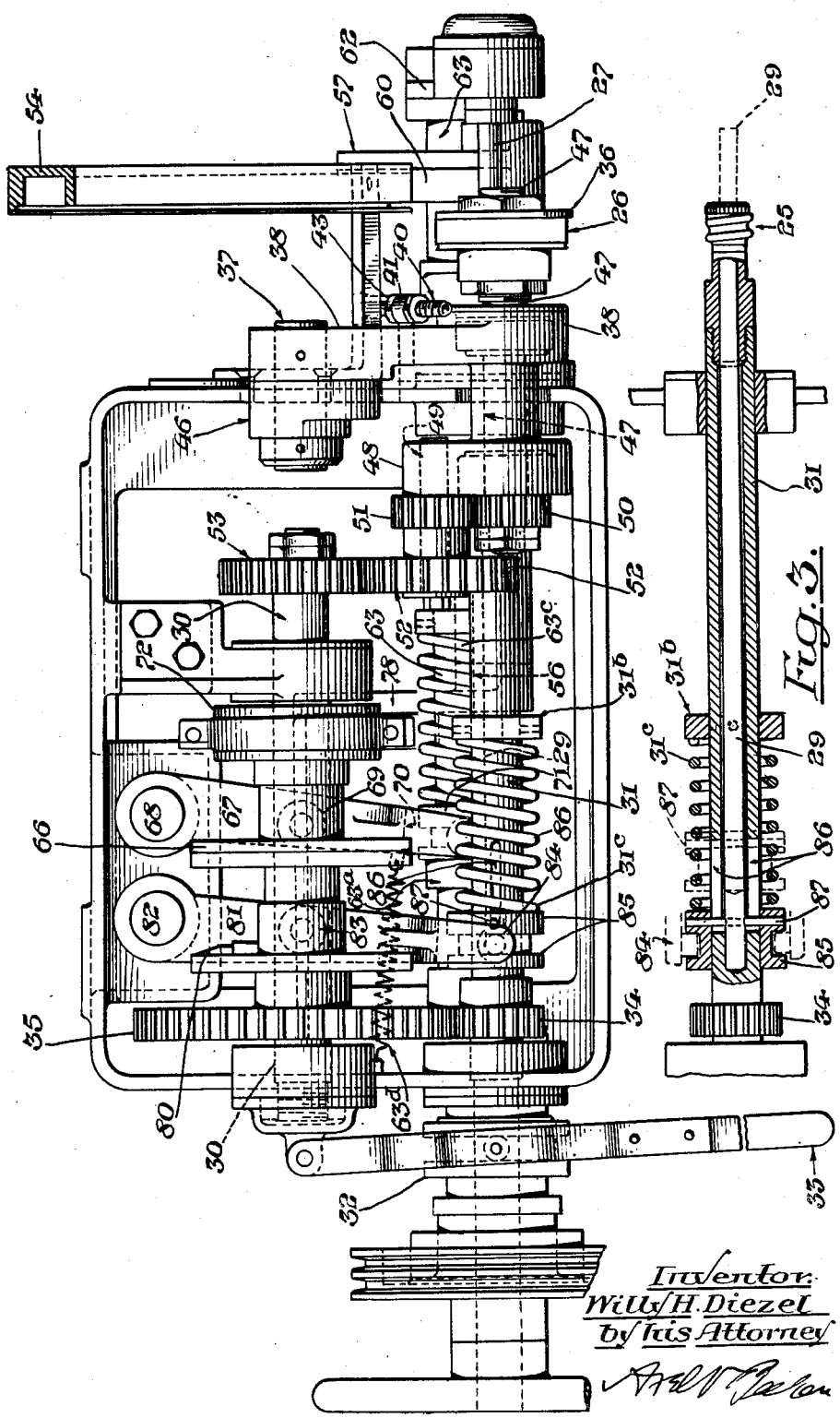

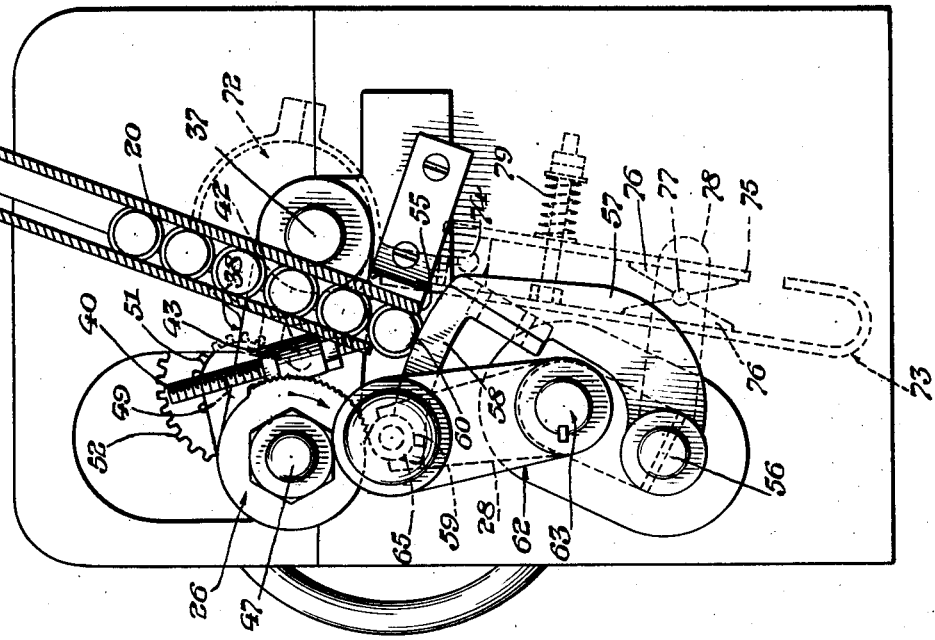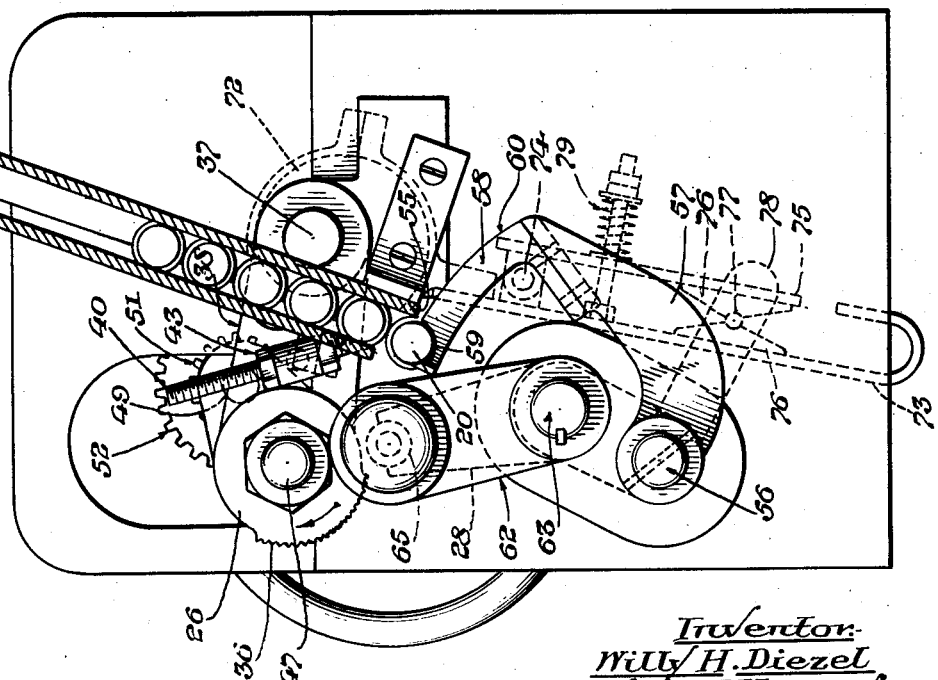

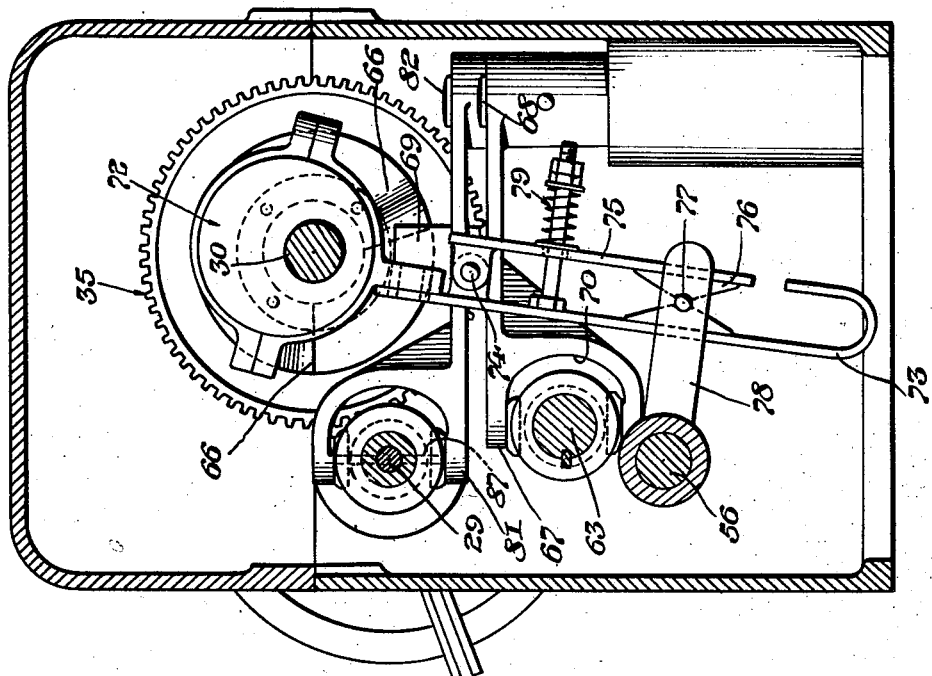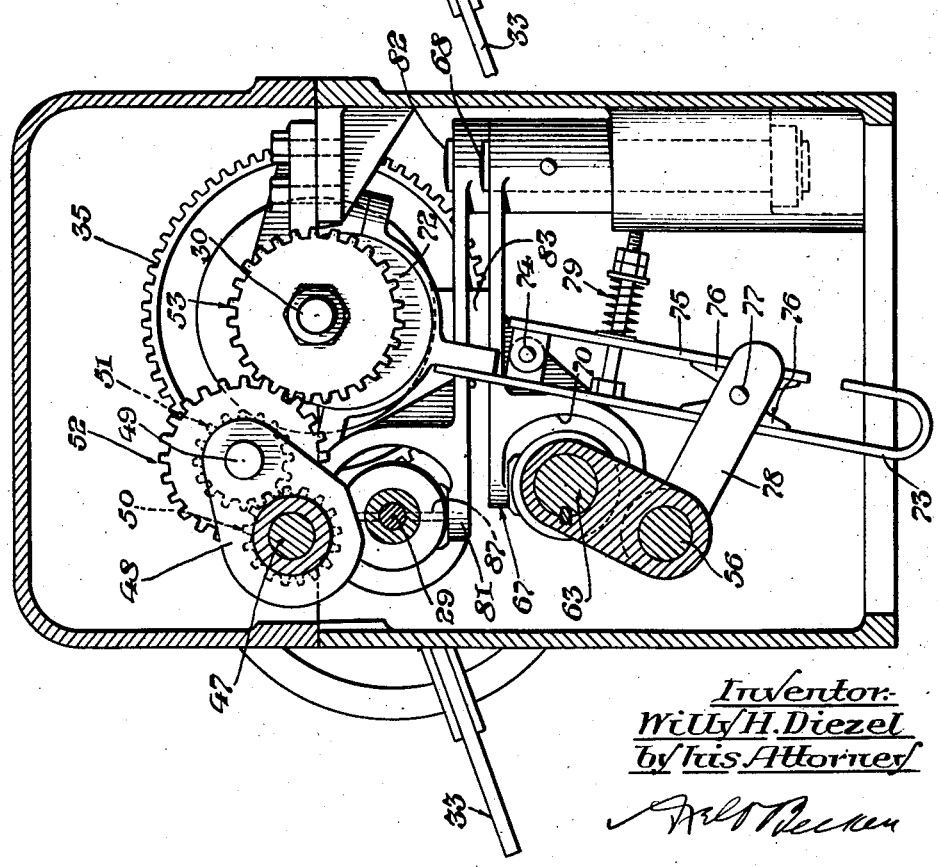

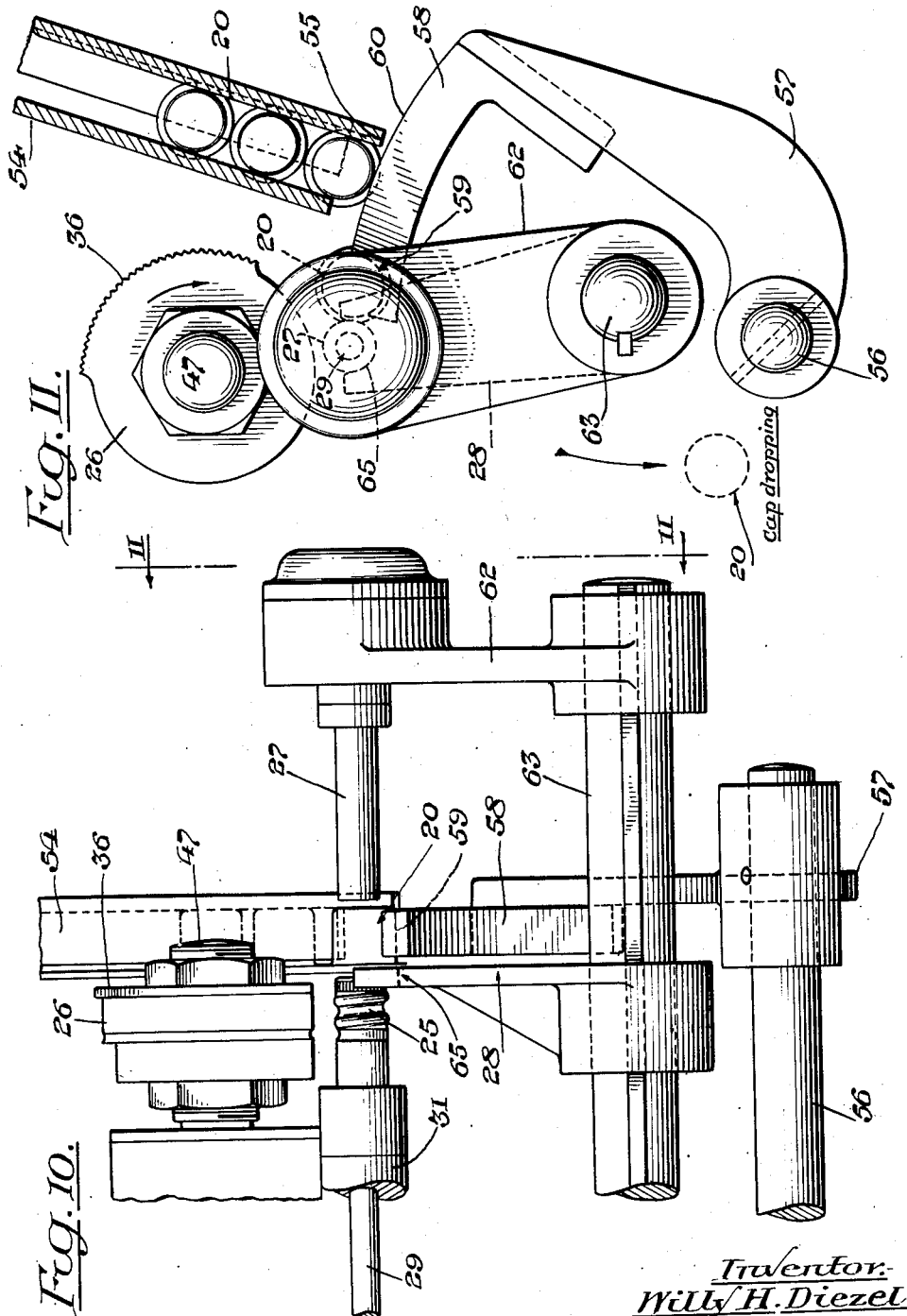

Aug. 19, 1952 W. H. DIEZEL 2,607,394
MACHINE FOR ADDITIONALLY SHAPING PREFORMED
CAPS OR OTHER WORKPIECES
Filed Oct. 18, 1949 9 Sheets-Sheet 7
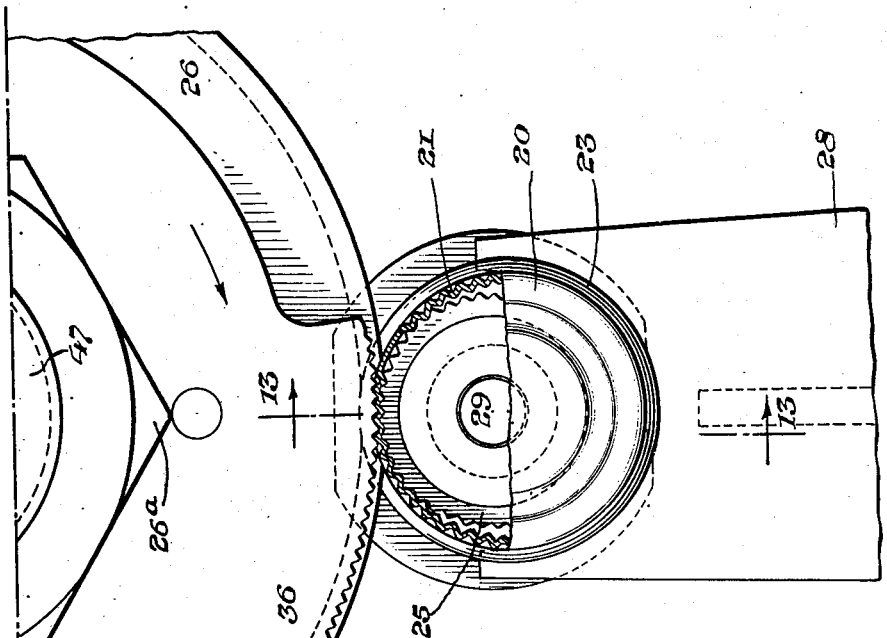
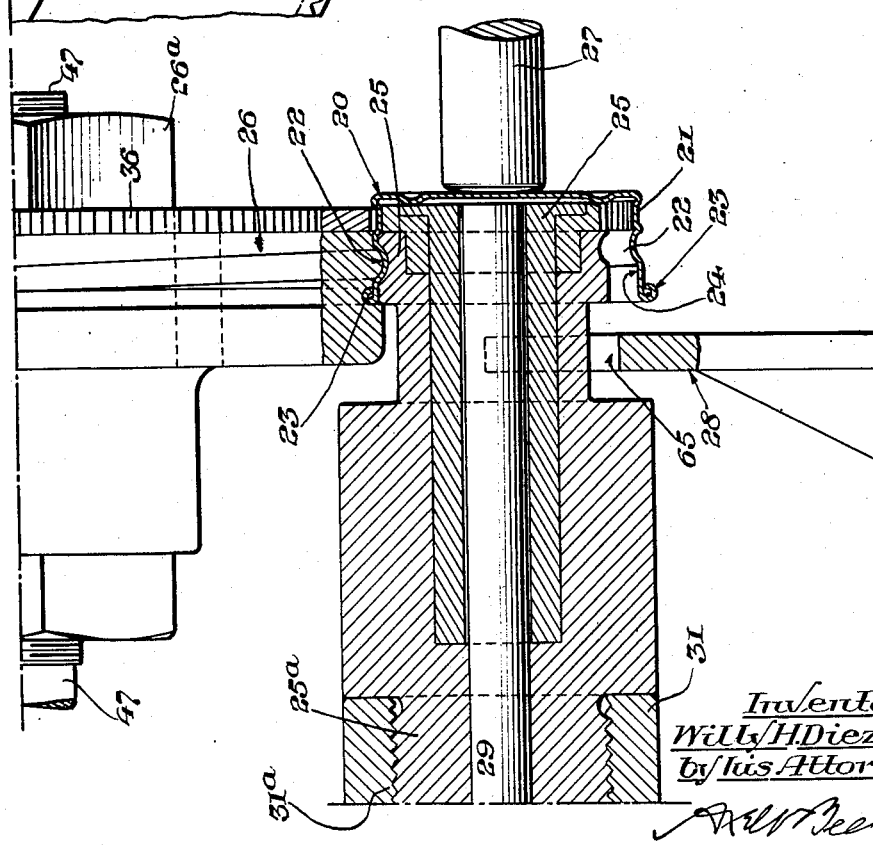
Inventor:
Willy H Diezel
by his Attorney Aug. 19, 1952 W. H. DIEZEL 2,607,394
MACHINE FOR ADDITIONALLY SHAPING PREFORMED
CAPS OR OTHER WORKPIECES
Filed Oct. 18, 1949 9 Sheets-Sheet 8
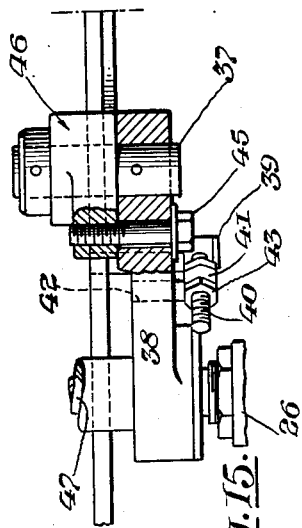
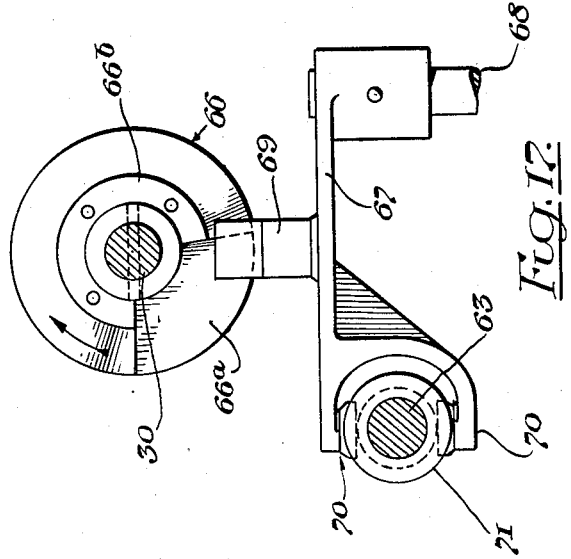
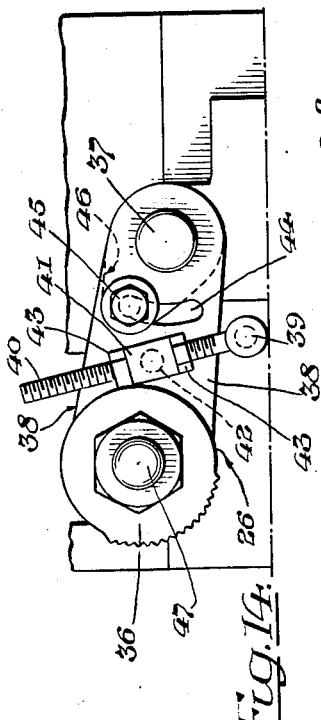
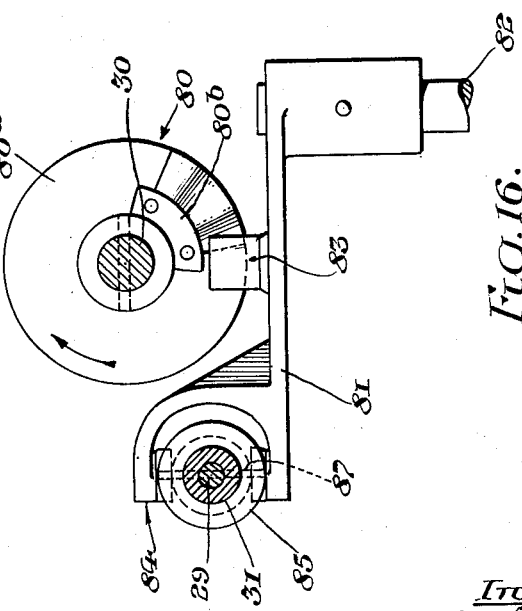
Inventor:
Willy H. Diezel
by his Attorney

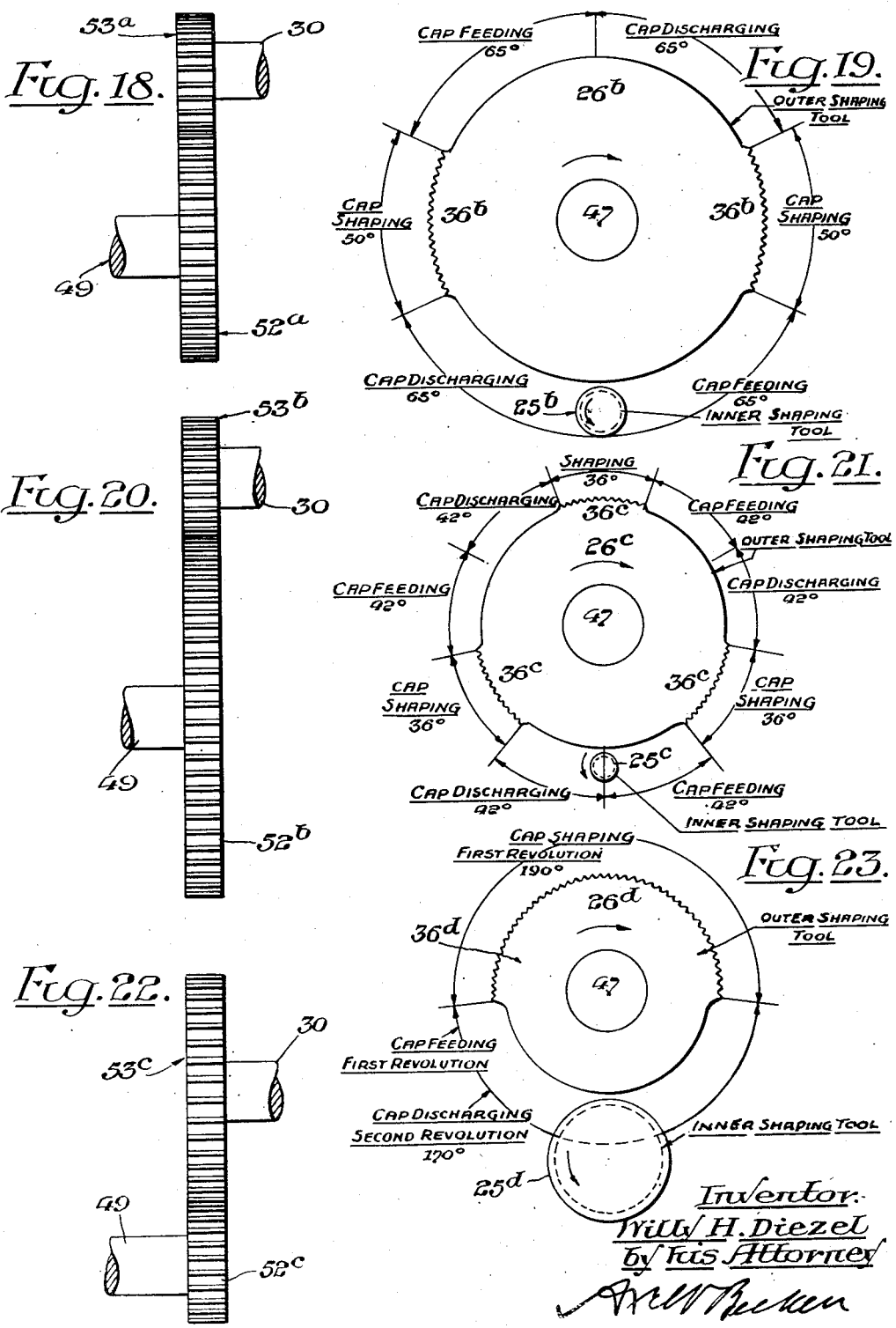

Patented Aug. 19, 1952

2,607,394

UNITED STATES PATENT OFFICE 2,607,394

MACHINE FOR ADDITIONALLY SHAPING PREFORMED CAPS OR OTHER WORKPIECES

Willy H. Diezel, Fairfield, Conn., assignor to The Max Ams Machine Company, Bridgeport, Conn., a corporation of New York Application October 18, 1949, Serial No. 121,936

2 Claims. (Cl. 153—2)

1

This invention relates to a machine for additionally shaping a preformed sheet-material work-piece, such as a bottle cap, and has for its main object and feature a device of simple and inexpensive construction so flexibly organized as to be capable, by a very slight change, to accurately shape any one of a series of caps ranging in size, for instance, from a diameter of three-eighths of an inch to four inches.

In the accompanying drawings, the invention is shown in a concrete and preferred form, in which:

Fig. 2 is a top-plan view of the machine shown in Fig. 1 with the top-cover removed;

Fig. 3 is a longitudinal sectional view of the driving shaft and related elements;

Fig. 4 is an end view looking in the direction of arrow 4 of Fig. 1 with the cap-chute in section, the parts occupying the position depicted in Fig. 9;

Fig. 5 is a view similar to Fig. 4 but with the parts shown in a different position;

Fig. 6 is a transverse sectional view substantially on the plane of line 6—6 of Fig. 1;

Fig. 7 is a transverse sectional view substantially on the plane of line 7—7 of Fig. 1, showing the parts in a different position from that depicted in Fig. 6;

Fig. 8 is an enlarged front elevational view of the right-hand end of the machine shown in Fig. 1;

Fig. 9 is a view similar to Fig. 8, the parts occupying the same position as that depicted in Fig. 4;

Fig. 10 is a view similar to Figs. 8 and 9, the parts occupying the same position as that depicted in Fig. 11;

Fig. 11 is a view looking in the direction of arrows 11—11 of Fig. 10;

Fig. 12 is an enlarged detail view showing the cooperation of the inner and outer shaping-tools in acting upon a cap, the cap being partly broken away;

Fig. 13 is a sectional view substantially on the plane of line 13—13 of Fig. 12;

Fig. 14 is a detail view in side elevation of the upper shaping-tool together with the means for carrying it and for adjusting its posiiton;

Fig. 15 is a top-plan view of the parts shown in Fig. 14, some of the parts being broken away and in section;

Fig. 16 is a detail view of the knock-out cam, and the parts operated thereby;

2

Figure 1:
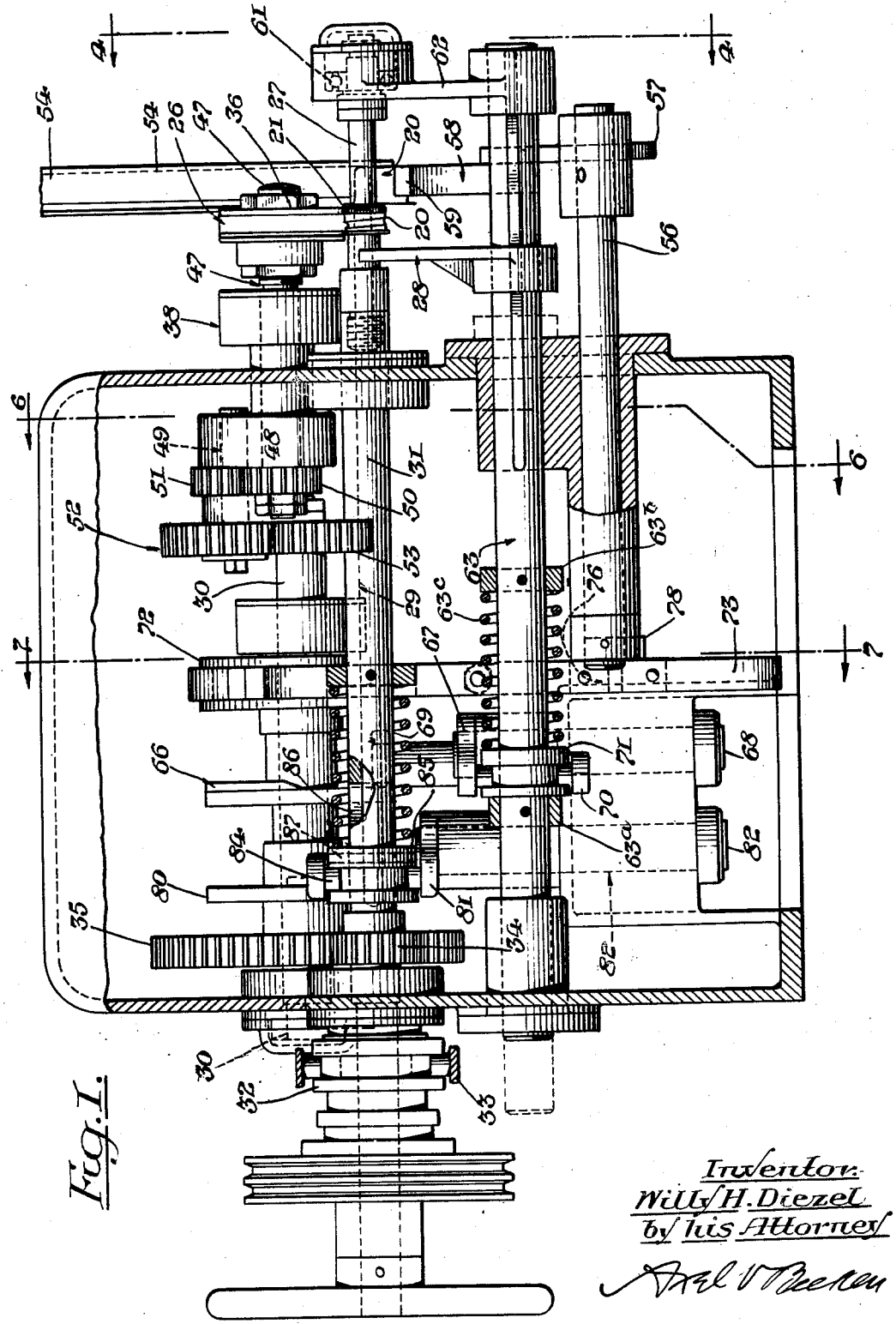
Fig. 1 is a view in front elevation of a machine embodying the invention, with the framework broken away and with parts in section.

Fig. 17 is a detail view of the cap-positioning and strip per cam, and the parts operated thereby; and Figs. 18 to 23 inclusive are a series of views more or less diagrammatic to illustrate the relationship between different change-speed gears and the form and relative size of the inner and outer shaping-tools.

The work to be done by the machine will be apparent from a consideration of Figs. 12 and 13. As there shown, 20 indicates a bottle cap, chosen for convenience of illustration as the work-piece being shaped. The shape being imparted to the cap is the conventional knurling 21, screw-threading 22, and curling 23 of cap-body 24. The shaping is performed by two complementary and rotatable shaping-tools, one an inner shaping-tool 25, and the other an outer shaping-tool 26. The blank cap is transferred by positioning member 27 to inner shaping-tool 25 on which latter it hangs in a pendent position, and the rolling action of the shaping-tools rotates the cap in shaping it. When the shaping of the cap has been finished, it is removed by stripper 28 and knock-out rod 29.

Different sizes of caps to be acted upon require different sizes of inner and outer shaping-tools 25 and 26 and such tools are therefore readily removable and replaceable. To this end, inner shaping-tool 25 is provided with a threaded portion 25$^a$ that engages an internally threaded portion 31$^a$ of shaft 31; so also, outer shaping-tool 26 is readily removable from its shaft 47 by reason of nut 26$^a$. It is preferred that inner shaping-tool 25 will always make the same number of revolutions per machine cycle, and, as a matter of convenience in calculation, the number of such revolutions has been established at four, although it should be added that the shaping of the cap always takes place during approximately one revolution of said inner shaping-tool. The outer shaping-tool 26, on the other hand will make one revolution, a plurality of revolutions, or a fraction of a revolution during each cycle of the machine as will be fully explained hereinafter. For the sake of simplicity it will, for the time being, be considered as making one revolution per machine cycle.

Turning now to the general organization of the machine, 30 indicates a shaft which (regardless of the diameter of cap acted upon) makes one revolution to each working-cycle of the machine, and which for the sake of convenience will be referred to as the main shaft or cam shaft. 31 denotes the shaft carrying inner shaping-tool 25 and will be referred to as the inner shaping-tool shaft; preferably it makes a constant plurality of revolutions, in this case four, to each working-cycle of the machine. In this instance, shaft 31 is also the driving shaft of the machine, motion being imparted thereto by any suitable means controlled by clutch 32 and clutch lever 33. Suitable transmission means, here pinion 34 and gear 35, connect shafts 31 and 30, so that, while shaft 31 makes four revolutions per working cycle, shaft 30 will make but one.

The shaping-faces of inner shaping-tool 25 extend completely around it, but the shaping-faces of outer shaping-tool 26 are here in the form of a sector 36 extending 120° of its circumference. Outer shaping-tool 26 has not only to be changed for different cap diameters, but also, since the diameter of the outer shaping-tool is always greater than that of the inner shaping-tool, the surface speed of said outer shaping-tool has to be coordinated with that of said inner shaping-tool. Besides, owing to the difference in diameter of various sizes of inner and outer shaping-tools, the position of the outer shaping-tool has to be adjusted; that is to say: the distance between the centers of rotation of said inner and outer shaping-tools has to be adjusted. Accordingly (Figs. 14 and 15), said outer shaping-tool is mounted as follows: 37 indicates a stationary supporting stud mounted in the framework, and 38 is a bracket-arm pivotally supported on stud 37. Pivotally mounted at 39 on the framework is a screw rod 40, and freely surrounding rod 40 and slidable thereon is a bushing 41 attached at 42 to bracket-arm 38. 43 are nuts to hold bushing 41 in the position to which it has been adjusted. 44 is a curved slot in bracket-arm 38, and 45 is a set-screw passing through slot 44 and anchored in stationary member 46. It will thus be seen that bracket-arm 38 can be adjusted to occupy various positions around stud 37, the axis of which latter is coincidental with a prolongation of the axis of main shaft 30. Mounted at the free end of bracket-arm 38 is outer shaping-tool shaft 47 at one end of which outer shaping-tool 26 is removably attached, so that a change can quickly be made from one size of outer shaping-tool 26 to that of another. Bracket-arm 38 has a transverse extension 48 spaced from and connected in parallel relation to its outer end, said shaft 47 extending therethrough and a stud shaft 49 being mounted therein in parallel relation to shaft 47. Shafts 47 and 49 are connected by pinions 50 and 51. Shaft 49 also carries a gear 52 meshing with gear 53 on main shaft 30. Gears 52 and 53 are removable change-speed gears for which others can be substituted when changing from a cap of one size to a cap of different size. In the present instance, the ratio of driven gear 52 and driving gear 53 is one to one, and pinions 50 and 51 also have a ratio of one to one.

54 indicates a chute in which caps 20 are placed and from the lower open end 55 of which the caps are fed by the means now to be described. 56 indicates a rockshaft mounted in the framework of the machine, and carrying an arm 57 having a curved cap-feeding member 58. At its outer end, member 58 is provided with a cap-receiving portion 59. Assuming the parts to be in the position shown in Fig. 4, it will be seen that a cap 20 will drop into cap-receiving portion 59. When rockshaft 56 moves arm 57 to the left (in Fig. 4), the upper curved portion 60 of arm 57 will pass beneath opening 55 of chute 54 and will hold the stack of caps in the chute. Further movement of arm 57 will carry the cap held in cap-receiving portion 59 to the position shown in Fig. 5, where it will be in line with inner shaping-tool 25. Transfer member 27 now moves the cap (Fig. 8) from cap-receiving portion 59 of arm 57 onto inner shaping-tool 25. Transfer member 27 is rotatably mounted in ball bearing 61, and said bearing is carried by an arm 62 mounted on reciprocatory shaft 63. Said shaft 63 also carries a stripper 28 having a bifurcated upper end 65 that straddles shaft 31 and by engaging the curled portion of the finished cap acts to strip or partially strip said finished cap from inner shaping-tool 25. Shaft 63 is reciprocated by any suitable means such as transfer and stripper cam 66 mounted on cam shaft 30. The action of cam 66 is imparted to shaft 63 by means of cam lever 67, mounted on upright rocker post 68, and carrying a cam roll 69. The outer end of cam lever 67 is bifurcated at 70 to engage grooved collar 71 on shaft 63. Shaft 63 carries two collars 63$^a$ and 63$^b$ in fixed position and a spring 63$^c$ surrounds the shaft and is interposed between the two collars. When the action of cam 66 moves grooved collar 71, shaft 63 will move to the right (in Figs. 1 and 2) but, in case any obstruction is encountered, compression of spring 63$^c$ will permit shaft 63 to yield. When cam 66 permits it to do so, spring 63$^d$ will move shaft 63 to the left (in Fig. 2) so as to restore it to its original position.

Rockshaft 56 which operates arms 57 is conveniently actuated from eccentric 72 on shaft 30 by the following means. Carried by eccentric 72 is a spring-arm 73 on which latter is pivotally supported, at 74, a second spring-arm 75. Carried by spring-arms 73 and 75 are complementary members 76 that constitute a releasable bearing to engage a pin 77 on arm 78 which latter is mounted on shaft 56. Spring-arms 73 and 75 are held toward each other to clasp pin 77 by means of spring-device 79. By the foregoing means, rotation of shaft 30 will cause rockshaft 56 to be actuated, but it will be observed that if anything, such as a jamming caused by a misplaced cap, interferes with the operation of the parts, pin 77 will free itself from the spring-arms so that no damage will be done to the machine.

It has already been pointed out that shaft 31, which carries internal shaping-tool 25, contains a knock-out rod 29. This knock-out rod is operated from cam 80, on cam shaft 30, by means of an arm 81 mounted on upright rocker post 82, said arm 81 having a cam roll 83 to engage cam 80, and having also a bifurcated member 84 to engage grooved collar 85 slidably mounted on shaft 31. Said shaft 31 has slots 86 through which extend pins 87 carried by collar 85 and connected to knock-out rod 29. Shaft 31 carries a fixed collar 31$^b$, and between that and grooved collar 85 is interposed a spring 31$^c$. Action of cam 80 moves grooved collar 85 thereby moving knock-out rod 29 to the right (in Fig. 3) and compressing spring 31$^c$, and when cam 80 permits it to do so, spring 31$^c$ will move rod 29 to the left (in Fig. 3) and will thus restore said rod to its original position.

Cams 66 and 80 each consists of a cam disc marked respectively 66$^a$ and 80$^a$ (Figs. 16 and 17) and removable cam faces marked respectively 66$^b$ and 80$^b$. If desired, other cam faces can be substituted to vary the stroke of shaft 63 and rod 29 to correspond to different heights of caps, or when it is desired to vary the timing of cams 66 and 80.

The operation of the machine can be summarized as follows:

Referring to Fig. 8, the parts are shown in the position where cap-feeding member 58 has brought a cap in line with inner shaping-tool 25 and transfer member 27, and said transfer member 27 has pushed the cap from member 58 onto inner shaping-tool 25. Outer shaping-tool 26 is about to engage the cap. Transfer member 27 remains in contact with the cap and rotates in its ball bearing 61 by reason of frictional engagement with said cap. Cap-feeding member 58 is about to return to chute 54 to receive a second cap.

Referring to Figs. 4 and 9, outer shaping-tool 26 has completed its work; shaft 63 has started to move to the right (in Fig. 9), thereby simultaneously carrying transfer member 27 and stripper 28 with it, the finished cap being shown partly stripped off inner shaping-tool 25; knock-out rod 29 has also begun to move to the right. Cap-feeding member 58 is standing still at chute 54, has received another cap and is about to move to the left (in Fig. 4).

Referring to Figs. 10 and 11, knock-out rod 29 has removed the finished cap from inner shaping-tool 25 and has returned to the left (in Fig. 10); the finished cap is dropping by gravity, and cap-feeding member 58 is moving to the left (in Fig. 11) and is about to bring the second cap into line with inner shaping-tool 25 and transfer member 27, after which the cycle of operation is repeated.

In the foregoing description it has been assumed that the ratio of change-speed gears or members 53 and 52 is 1:1, which, of course, means that outer shaping-tool 26 makes one revolution to each machine cycle or one revolution to each revolution of main shaft 30. When so equipped, the machine is in condition to act upon a size of cap of 1″ diameter. The diameter of inner shaping-tool 25 is smaller than the inside diameter of the cap before shaping to this extent: Inside diameter of cap minus twice the thread depth and minus approximately $\frac{1}{32}$ of an inch, so as to enable the finished cap to be stripped from the inner-shaping tool. In these circumstances, outer-shaping tool 26 will have a 4″ diameter. By these means the surface speed of the inner and outer shaping-tools will be substantially the same, as will be seen from the following formula: 1″ diameter of the cap × 3.14 × 4 revolutions per machine cycle equals 4″ diameter of the outer shaping-tool × 3.14 during one revolution of said outer shaping-tool.

In Fig. 10, change-speed gears or members 53ª and 52ª have a ratio of 2:1. Consequently, outer shaping-tool 26ᵇ of Fig. 19 will make ½ of a revolution to each machine cycle, and will therefore have two sectors 36ᵇ.

In Fig. 20, the ratio between the change-speed gears or members 53ᵇ and 52ᵇ is 3:1. Consequently, outer shaping-tool 26ᶜ of Fig. 21 makes ⅓ of a revolution to each machine cycle, and is therefore provided with three sectors 36ᶜ.

In Fig. 22, the ratio between change-speed gears or members 53ᶜ and 52ᶜ is 1:2. Consequently, outer shaping tool 26ᵈ makes two revolutions per machine cycle, and is provided with a single sector 36ᵈ extending 190° around the circumference of said outer shaping-tool. In this case the cap is fed during 170° of the first revolution of outer shaping-tool 26ᵈ, after which, during the same revolution, the cap is acted upon by sector 36ᵈ during approximately 190°. During the second revolution of outer shaping-tool 26ᵈ, the finished cap is discharged during approximately 170°, and the 190° of sector 36ᵈ is an idle one during the second revolution.

As an example of the sizes and arrangement of the parts to obtain the desired circumferential speed of the inner and outer shaping-tools, the following table is referred to:

| Cap Diameter | Diameter of Outer Shaping-Tool | Number of Revolutions of Outer Shaping-Tool per Machine Cycle | Gear Ratio between Cam Shaft and Outer Shaping-Tool | Center Distance between Inner and Outer Shaping-Tools |
|---|---|---|---|---|
| ⅜ | 4½ | ⅛ | 3:1 | 2 7/16 |
| ¾ | 6 | ½ | 2:1 | 3⅜ |
| 1 | 4 | 1 | 1:1 | 2½ |
| 1½ | 6 | 1 | 1:1 | 3¾ |
| 2 | 4 | 2 | 1:2 | 3 |
| 2½ | 5 | 2 | 1:2 | 3¾ |
| 3 | 6 | 2 | 1:2 | 4½ |
| 3½ | 7 | 2 | 1:2 | 5¼ |
| 4 | 8 | 2 | 1:2 | 6 |

An analysis of the foregoing reveals that the method of substantially coordinating the surface or peripheral speed of the shaping-tools to act on work-pieces of different diameters comprises: maintaining the speed of rotation (as distinguished from the surface speed) of inner shaping-tool 25 and its number of revolutions per machine cycle constant, regardless of differences in diameter of different work-pieces, and in varying the speed of rotation of outer shaping-tool 26, and its extent of revolution per machine cycle, in conformity with the diameter of the work-piece to be acted upon. The statement that the speed of rotation of inner shaping-tool 25 remains constant does not means that the machine as a whole cannot be run at different speeds; it means that the speed relationship between main shaft 30 and inner shaping-tool 25 remains constant.

I claim:

1. In a machine for additionally shaping preformed sheet-material work-pieces having, at different times, different diameters: a main shaft making one revolution to each machine cycle; an inner shaping-tool shaft, having a fixed center of rotation, and making a plurality of revolutions to each machine cycle; a removable and replaceable inner shaping-tool, mounted on said inner shaping-tool shaft, and having a circumferentially continuous shaping face; an outer shaping-tool shaft arranged parallel to the inner shaping-tool shaft, mounted on a center of rotation at all times, during a machine cycle equidistant from that of the inner shaping-tool shaft; a removable and replaceable outer shaping-tool, having one or more sectors constituting a shaping face or faces, depending upon the diameter of the work-piece to be acted upon; transmission means, including removable and replaceable transmission members, to rotate said outer shaping-tool shaft from said main shaft, the extent of rotation of said outer shaping-tool shaft, during a machine cycle, being varied in accordance with the diameter of the work-piece and the number of sectors carried by the outer shaping-tool; and means to adjust the distance of said outer shaping-tool shaft from said inner shaping-tool shaft.

2. In a machine for additionally shaping preformed sheet-material work-pieces having, at different times, different diameters: a main shaft making one revolution to each machine cycle; an inner shaping-tool shaft, having a fixed center of rotation, and making a plurality of revolutions to each machine cycle; a removable and replaceable inner shaping-tool, mounted on said inner shaping-tool shaft, and having a circumferentially continuous shaping face; an outer shaping-tool shaft arranged parallel to the inner shaping-tool shaft; a removable and replaceable outer shaping-tool, having one or more sectors constituting a shaping face or faces, depending upon the diameter of the work-piece to be acted upon; a supporting stud, the axis of which is coincidental with a prolongation of the axis of the main shaft; a bracket, mounted on said stud, to sustain said outer shaping-tool shaft, at all times during a machine cycle, equidistant from that of the inner shaping-tool shaft; means to adjust said bracket circumferentially on said supporting stud; a stub shaft carried by said bracket parallel to said outer shaping-tool shaft; transmission means between the stub shaft and the outer shaping-tool shaft to drive the latter from the former at the same speed; and removable and replaceable transmission members to rotate said stub shaft from said main shaft, the extent of rotation of said stub shaft, during a machine cycle, being varied in accordance with the diameter of the work-piece and the number of sectors carried by the outer shaping-tool.

WILLY H. DIEZEL.

REFERENCES CITED

The following references are of record in the file of this patent:

UNITED STATES PATENTS

| Number | Name | Date |
| --- | --- | --- |
| 250,209 | Crane | Nov. 29, 1881 |
| 666,672 | Hoffman | Jan. 29, 1901 |
| 1,254,026 | Carvalho | Jan. 22, 1918 |
| 1,462,675 | Whittington | July 24, 1923 |
| 1,582,973 | Dodd | May 4, 1926 |
| 1,639,367 | Cameron | Aug. 16, 1927 |
| 1,719,230 | McDonald | July 2, 1929 |
| 2,325,827 | Berlichingen | Aug. 3, 1943 |
| 2,436,746 | Drought | Feb. 24, 1948 |
| 2,465,253 | Montelione | Mar. 22, 1949 |

FOREIGN PATENTS

| Number | Country | Date |
| --- | --- | --- |
| 12,426 | Great Britain | Aug. 30, 1915 |